United States Patent
Rosenbaum et al.

(10) Patent No.: US 8,562,819 B2
(45) Date of Patent: Oct. 22, 2013

(54) PROCESS TO MANUFACTURE A BASE STOCK AND A BASE OIL MANUFACTURING PLANT

(75) Inventors: John M. Rosenbaum, Richmond, CA (US); Brent K. Lok, San Francisco, CA (US); Kathy A. Helling, Santa Rosa, CA (US); Steve K. Lee, Oakland, CA (US); Ryan J. Schexnaydre, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 630 days.

(21) Appl. No.: 12/482,082

(22) Filed: Jun. 10, 2009

(65) Prior Publication Data
US 2010/0078355 A1    Apr. 1, 2010

Related U.S. Application Data

(60) Provisional application No. 61/101,676, filed on Oct. 1, 2008.

(51) Int. Cl.
*C10G 69/02* (2006.01)
*C10G 73/02* (2006.01)

(52) U.S. Cl.
USPC .............. 208/60; 208/18; 208/58; 208/96; 208/134; 208/141

(58) Field of Classification Search
USPC ............ 208/18, 19, 58, 60, 96, 133, 134, 141
See application file for complete search history.

(56) References Cited

U.S. PATENT DOCUMENTS

| | | | |
|---|---|---|---|
| 2,489,300 A | 11/1949 | Leyda | |
| 3,912,620 A | 10/1975 | Gallagher | |
| 4,464,277 A | 8/1984 | Cousineau et al. | |
| 4,519,925 A | 5/1985 | Smith | |
| 6,337,010 B1 | 1/2002 | Hofer | |
| 7,141,157 B2 | 11/2006 | Rosenbaum et al. | |
| 7,144,497 B2 | 12/2006 | Lok et al. | |
| 2003/0139303 A1 | 7/2003 | Scharf et al. | |
| 2004/0077505 A1* | 4/2004 | Daniel et al. | 508/110 |
| 2004/0178118 A1 | 9/2004 | Rosenbaum et al. | |
| 2005/0092653 A1 | 5/2005 | Farshid et al. | |
| 2005/0261145 A1 | 11/2005 | Rosenbaum et al. | |
| 2007/0272592 A1 | 11/2007 | Germaine et al. | |
| 2008/0029431 A1 | 2/2008 | Alexander et al. | |
| 2008/0083657 A1 | 4/2008 | Zones et al. | |
| 2008/0110797 A1* | 5/2008 | Fyfe et al. | 208/18 |
| 2008/0149529 A1 | 6/2008 | Rosenbaum et al. | |

FOREIGN PATENT DOCUMENTS

| | | |
|---|---|---|
| EP | 1313826 | 10/2007 |
| WO | WO2006101583 | 9/2006 |

* cited by examiner

*Primary Examiner* — Walter D Griffin
*Assistant Examiner* — Renee E Robinson
(74) *Attorney, Agent, or Firm* — Jeffrey M. McQuiston; Susan M. Abernathy

(57) ABSTRACT

We provide a process to manufacture a base stock, comprising hydrocracking, separating, and dewaxing, wherein the base stock has a ratio of Noack volatility to CCS VIS at −25° C. multiplied by 100 from 0.15 to 0.40. We also provide a base stock made by a process, and a base oil manufacturing plant that produces the base stock.

5 Claims, 1 Drawing Sheet

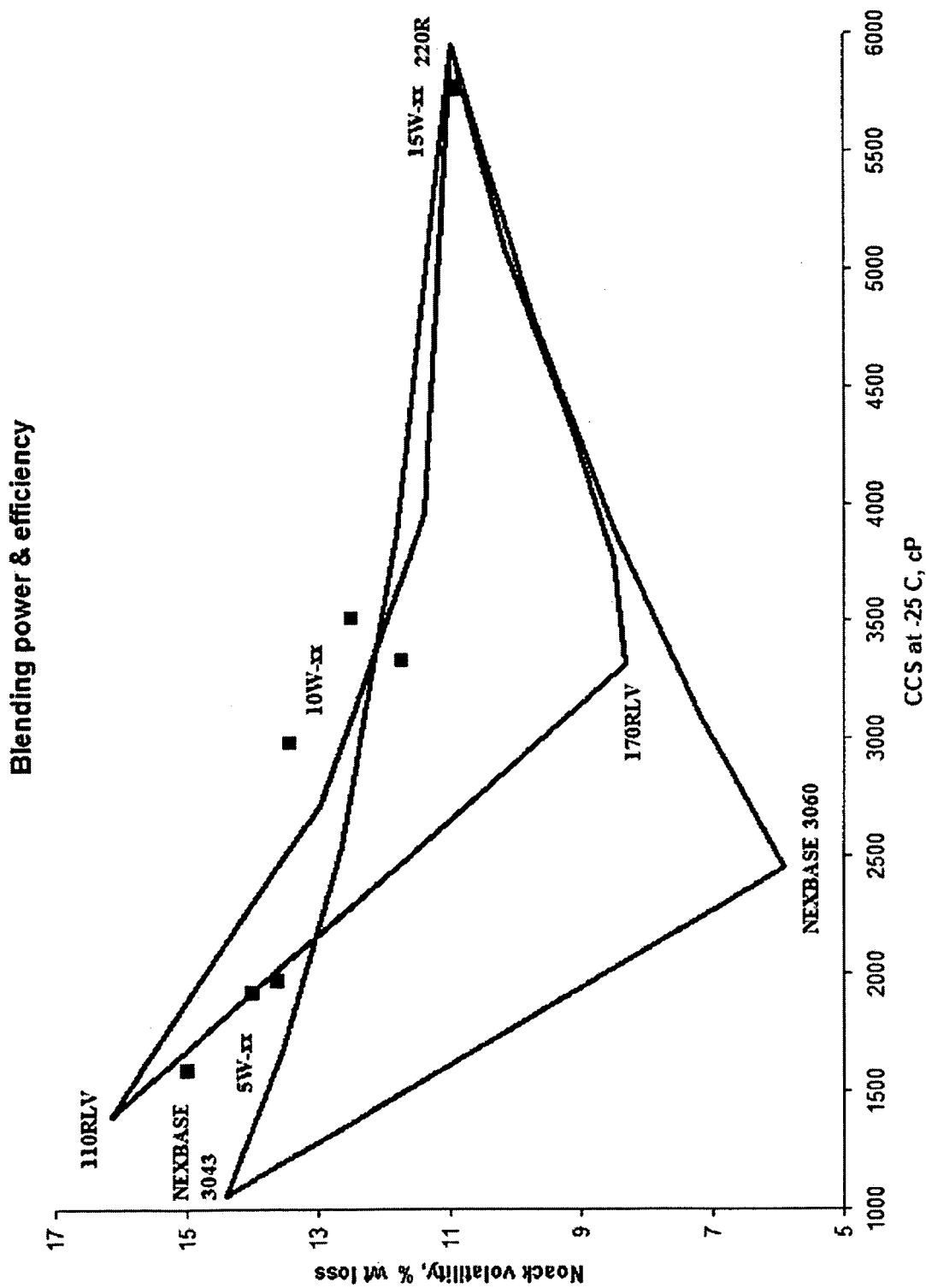

US 8,562,819 B2

PROCESS TO MANUFACTURE A BASE STOCK AND A BASE OIL MANUFACTURING PLANT

This application claims the benefit of provisional Application No. 61/101,676, filed Oct. 1, 2008, herein incorporated in its entirety.

This application is related to co-filed patent applications titled "A 110 Neutral Base Oil with Improved Properties", "A Process to Make a 110 Neutral Base Oil with Improved Properties", "A Method for Predicting a Property of a Base Oil", and "A 170 Neutral Base Oil with Improved Properties"; herein incorporated in their entireties.

FIELD OF THE INVENTION

This invention is directed to base stocks with defined boiling ranges, viscosity indexes, Noack volatilities, and/or CCS VIS at −25° C. This invention is also directed to a base stock slate of these base stocks, a process to manufacture these base stocks, the base stock made by a process, and a base oil manufacturing plant.

BRIEF DESCRIPTION OF THE DRAWING

FIG. 1 illustrates the blending power and efficiency that Chevron 110RLV and Chevron 170RLV bring to formulating 5W-XX, 10W-XX, and 15W-XX engine oils compared with Nexbase Group III base stocks. Chevron 110RLV and Chevron 170RLV are new base stocks with improved properties. Chevron 220R is a commercial Group II base stock. Nexbase 3043 and Nexbase 3060 are commercial Group III base stocks.

DETAILED DESCRIPTION OF THE INVENTION

Definitions

The term "comprising" means including the elements or steps that are identified following that term, but any such elements or steps are not exhaustive, and an embodiment may include other elements or steps.

"Consecutive numbers of carbon atoms" means that the base oil has a distribution of hydrocarbon molecules over a range of carbon numbers, with every number of carbon numbers in-between. For example, the base oil may have hydrocarbon molecules ranging from C22 to C36 or from C30 to C60 with every carbon number in-between. The hydrocarbon molecules of the base oil differ from each other by consecutive numbers of carbon atoms, as a consequence of the waxy feed used to make the base oil also having consecutive numbers of carbon atoms. For example, in the Fischer-Tropsch hydrocarbon synthesis reaction, the source of carbon atoms is CO and the hydrocarbon molecules are built up one carbon atom at a time. Petroleum-derived waxy feeds have consecutive numbers of carbon atoms. In contrast to an oil based on polyalphaolefin, the molecules of a base oil made from a waxy feed having consecutive numbers of carbon atoms have a more linear structure, comprising a relatively long backbone with short branches. The classic textbook description of a polyalphaolefin is a star-shaped molecule, and in particular tridecane, which is illustrated as three decane molecules attached at a central point. While a star-shaped molecule is theoretical, nevertheless polyalphaolefin molecules have fewer and longer branches that the hydrocarbon molecules that make up the base oil disclosed herein.

A "base stock" is a lubricant component that is produced by a single manufacturer to the same specifications (independent of feed source or manufacturer's location): that meets the same manufacturer's specification; and that is identified by a unique formula, product identification number, or both. Base stocks may be manufactured using a variety of different processes including but not limited to distillation, solvent refining, hydrogen processing, oligomerization, esterification, and rerefining.

A "base oil" is a base stock or blend of different base stocks. It is suitable for blending with additives into finished lubricants meeting desired specifications.

A "base stock slate" is a product line of base stocks that have different viscosities but are in the same base stock grouping and from the same manufacturer.

"Block dewaxing" is a catalytic dewaxing process wherein a separated fraction from a waxy hydrocarbon, having a narrower boiling range than the waxy hydrocarbon, is upgraded into a base stock. It is contrasted with "bulk dewaxing" where a broad boiling range waxy hydrocarbon is catalytically dewaxed, and wherein one or more separating steps to produce a base stock are done following the catalytic dewaxing step.

Test Method Descriptions:

"Boiling range" is the 5 wt % boiling point to the 95 wt %, inclusive of the end points, as measured by ASTM D 6352-04 and referred to herein as SimDist. A hydrocarbon with a boiling range of 700 to 900° F., for example, has a 5 wt % boiling point greater than 700° F. and a 95 wt % boiling point less than 900° F.

"Kinematic viscosity" is a measurement in $mm^2/s$ of the resistance to flow of a fluid under gravity, determined by ASTM D445-06.

"Viscosity index" (VI) is an empirical, unit-less number indicating the effect of temperature change on the kinematic viscosity of the oil. The higher the VI of an oil, the lower its tendency to change viscosity with temperature. VI is measured according to ASTM D 2270-04.

"Cold-cranking simulator apparent viscosity" (CCS VIS) is a measurement in millipascal seconds, mPa·s, to measure the viscometric properties of lubricating base oils under low temperature and low shear. CCS VIS is determined by ASTM D 5293-04.

"Noack volatility" is defined as the mass of oil, expressed in weight %, which is lost when the oil is heated at 250° C. with a constant flow of air drawn through it for 60 minutes, measured according to ASTM D5800-05, Procedure B.

Base Stock

We have developed a base stock, comprising hydrocarbons with consecutive numbers of carbon atoms. In one embodiment the base stock has a boiling range from 730 to 1000° F. (388 to 538° C.); a VI from 105 to less than 120; and a Noack volatility from 6.6 to 11.5 wt %. In a second embodiment, the base stock has a boiling range from 730 to 1000° F. (388 to 538° C.); a VI from 105 to less than 120; and a CCS VIS at −25° C. from 2500 to 4500 mPa·s.

The VI is less than 120, which keeps the base stock within the VI limits for a Group II base oil. The VI is generally from 105 to less than 120, but in other embodiments may be from 110 to less than 120, from 113 to less than 120, or from 115 to less than 120. The Noack volatility is generally in a range from 6 to 12 wt %, and in one embodiment is from 6.6 to 11.5 wt %. In other embodiments the Noack volatility may be from 7 to 11 wt %, from 7.5 to 10 wt %, or from 8 to 9.5 wt %.

In some embodiments the base stock has a ratio of the Noack volatility to a CCS VIS at −25° C. multiplied by 100 in a specified range. The range may be from 0.15 to 0.40, from 0.20 to 0.35, or from 0.25 to 0.30.

The base stock may additionally comprise a second base stock. In one embodiment the second base stock is a Group II base oil. Group II, Group III, and Group IV base oils are defined in Appendix E of the API 1509 specification, April 2008. A Group II base oil has greater than or equal to 90 percent saturates and less than or equal to 0.03 percent sulfur and has a VI greater than or equal to 80 and less than 120. A Group III base oil has greater than or equal to 90 percent saturates and less than or equal to 0.03 percent sulfur and has a VI greater than or equal to 120. A Group IV base oil is a polyalphaolefin.

In one embodiment the second base stock has a kinematic viscosity at 40° C. from 40.00 to 46.00 mm$^2$/s. An example of this second type of base stock is Chevron 220R.

In another embodiment the second base stock is a 110 Neutral base oil. 110 Neutral base oils have a SUS viscosity at 100° F. of approximately 110. One example is ConocoPhillips 110N. Another example is a ° 110N" comprising Fischer-Tropsch derived base oil. This for example may be a blend of Fischer-Tropsch derived base oil, Chevron 220R, and Ergon Hygold 100. This example is fully described in U.S. patent application Ser. No. 12/047,887, filed Mar. 13, 2008. Kinematic viscosity in mm$^2$/s at 100° F. can be converted to SUS viscosity at 100° F. according to the arithmetic and the reference table provided in ASTM D 2161-05. In one embodiment the 110 Neutral base oil has a second boiling range from 700 to 925° F. (371 to 496° C.), a second VI from 105 to 115, and a second volatility less than 18 wt %. This second base stock is fully described in our co-filed patent application titled "A 110 Neutral Base Oil with Improved Properties".

In another embodiment the base stock may additionally comprise a third base stock. The third base stock can be a Group II base oil. In one embodiment the base stock is comprised entirely of Group II base oils.

In one embodiment the base stock comprises a second base stock that has a kinematic viscosity at 40° C. from 40.00 to 46.00 mm$^2$/s and a third base stock that is a Group II base oil. The third base stock may have a third boiling range from 700 to 925° F. (371 to 496° C.), a third VI from 105 to 115, and a third Noack volatility less than 18 wt %.

One feature of the base stock is that it can be blended into a wide variety of high quality finished lubricants by blending the base stock with one or more additives. Examples of finished lubricants that can be made from the base stock include engine oils, greases, heavy duty motor oils, passenger car motor oils, transmission and torque fluids, natural gas engine oils, marine lubricants, railroad lubricants, aviation lubricants, food processing lubricants, paper and forest products, metalworking fluids, gear lubricants, compressor lubricants, turbine oils, hydraulic oils, heat transfer oils, barrier fluids, and other industrial products. In one embodiment the base stock can be blended into a multigrade engine oil. Examples of multigrade engine oils that can be blended with the base stock are 5W-XX, 10W-XX, and 15W-XX, wherein XX is selected from the group consisting of 20, 30, 40, 50, and 60.

One advantage of the base stocks are that they can be blended into finished lubricants without using expensive and highly processed base oils that are very expensive. For example the finished lubricant may have less than 20 wt %, less than 10 wt %, less than 5 wt %, or no Group III or Group IV base oil. Alternatively, the finished lubricant may have less than 20 wt %, less than 10 wt %, less than 5 wt %, or no highly paraffinic unconventional base oil.

Base Stock Slate

We have developed a base stock slate comprising a first base stock and an additional base stock. The first base stock has a first boiling range from 730 to 1000° F. (388 to 538° C.), a first VI from 105 to less than 120, a first Noack volatility from 6.6 to 11.5 wt %, and a first CCS VIS at −25° C. from 2500 to 4500 mPa·s. This is the same base stock as described earlier in this specification, and can have alternate embodiments within these general ranges of properties as described previously.

The second base stock has an additional boiling range from 700 to 925° F. (371 to 496° C.), an additional VI from 105 to 115, and an additional Noack volatility less than 18 wt %. This base stock is described in our co-filed patent application titled "A 110 Neutral Base Oil with Improved Properties". In one embodiment the additional base stock has a ratio of the additional Noack volatility to an additional CCS VIS at −25° C. multiplied by 100 from 0.80 to 1.55. In other embodiments the ratio of the additional Noack volatility to the additional CCS VIS at −25° C. multiplied by 100 may be from 0.90 to 1.40, from 0.90 to 1.30, or from 1.0 to 1.30.

In one embodiment the first base stock has a ratio of the first Noack volatility to the first CCS VIS at −25° C. multiplied by 100 from 0.15 to 0.40. In other embodiments the ratio of the first Noack volatility to the first CCS VIS at −25° C. multiplied by 100 may be from 0.20 to 0.35, or from 0.25 to 0.30.

In one embodiment of the base stock slate, the first base stock and the additional base stock are both Group II base oils. A base stock slate with all Group II base oils gives a technical advantage to formulators of finished lubricants who wish to blend with all Group II base oils. This is especially an advantage for formulators of engine oils who wish to reduce the expenses of testing required for base oil interchanges between different groups of base oils.

Process to Manufacture Base Stock

We provide a process to manufacture a base stock, comprising hydrocracking, separating, and dewaxing. The hydrocracking is done by hydrocracking a heavy hydrocarbon feedstock in a hydrocracking zone. The hydrocracking zone may be a reactor specifically designed for hydrocracking. The operating conditions are selected to convert the heavy hydrocarbon feedstock to a product slate containing greater than 20 wt % of a waxy intermediate fraction. The intermediate fraction is separated into a lower boiling fraction and a higher boiling fraction. The higher boiling fraction is dewaxed under conditions whereby the dewaxed higher boiling fraction has a first boiling range from 730 to 1000° F. (388 to 538° C.), a first VI from 105 to 120, a first CCS VIS at −25° C. from 2500 to 4500 mPa·s, and a ratio of a first Noack volatility to the first CCS VIS at −25° C. multiplied, by 100 from 0.15 to 0.40.

In one embodiment, the process also includes dewaxing the lower boiling fraction under conditions whereby the dewaxed lower boiling fraction has an additional boiling range from 700 to 925° F. (371 to 496° C.), an additional VI from 105 to 115, and an additional Noack volatility less than 18 wt %.

The dewaxing may be done by a number of different processes, including hydroisomerization dewaxing, solvent dewaxing, or a combination thereof. An integrated process for preparing a base stock having an exceptionally high VI, including a hydroisomerization step followed by a solvent dewaxing step, is described in U.S. Pat. No. 7,074,320. An alternate process comprising solvent dewaxing followed by catalytic dewaxing is described in U.S. Pat. No. 4,622,130.

Hydrocracking

The operating conditions in the hydrocracking zone are selected to convert a heavy hydrocarbon feedstock to a product slate containing greater than 20 wt %, greater than 25 wt %, or greater than 30 wt % of a waxy intermediate fraction which is upgraded to the original base oil. In different embodiments the operating conditions in the hydrocracking zone can be selected to convert a heavy hydrocarbon feedstock to a product slate containing from greater than 20 wt %, greater than 25 wt %, greater than 30 wt %, from greater than 32 wt %, or greater than 34 wt % of a waxy intermediate fraction. In different embodiments the operating conditions in the hydrocracking zone can be selected to convert a heavy hydrocarbon feedstock to a product slate containing less than 60 wt %, less than 50 wt %, less than 40 wt %, or less than 35 wt % of a waxy intermediate fraction. In one embodiment the operating conditions in the hydrocracking zone are selected to convert a heavy hydrocarbon feedstock to a product slate containing from greater than 20 wt %, greater than 25 wt %, or greater than 30 wt % to less than 40 wt % of a waxy intermediate.

The temperature in the hydrocracking zone will be within the range of from about 500° F. (260° C.) to about 900° F. (480° C.), such as within the range of from about 650° F. (345° C.) to about 800° F. (425° C.). A total pressure above 1000 psig is used. For example the total pressure can be above about 1500 psig, or above about 2000 psig. Although greater maximum pressures have been reported in the literature and may be operable, the maximum practical total pressure generally will not exceed about 3000 psig. Liquid hourly space velocity (LHSV) will usually fall within the range of from about 0.2 to about 5.0, such as from about 0.5 to about 1.5. The supply of hydrogen (both make-up and recycle) is preferably in excess of the stoichiometric amount needed to crack the target molecules and will usually fall within the range of from about 500 to about 20,000 standard cubic feet (SCF) per barrel. In one embodiment the hydrogen will be within the range from about 2000 to about 10,000 SCF per barrel.

The catalysts used in the hydrocracking zone are composed of natural and synthetic materials having hydrogenation and dehydrogenation activity. These catalysts are pre-selected to crack the target molecules and produce the desired product slate. The hydrocracking catalyst is selected to convert a heavy hydrocarbon feedstock to a product slate containing a commercially significant amount of a waxy intermediate fraction which will be upgraded to the original base stock. Exemplary commercial cracking catalysts generally contain a support consisting of alumina, silica, silica-alumina composites, silica-alumina-zirconia composites, silica-alumina-titania composites, acid treated clays, crystalline aluminosilicate zeolitic molecular sieves, such as zeolite A, faujasite, zeolite X, zeolite Y, and various combinations of the above. The hydrogenation/dehydrogenation components generally consist of a metal or metal compound of Group VIII or Group VIB of the periodic table of the elements. Metals and their compounds such as, for example, cobalt, nickel, molybdenum, tungsten, platinum, palladium and combinations thereof are known hydrogenation components of hydrocracking catalysts.

Separating

Separating is done by distillation. In one embodiment the lower boiling fraction and higher boiling fractions are separated by carefully controlled vacuum distillation having a tower top temperature, a tower bottom temperature, a tower top pressure and a tower bottom pressure that are selected to cleanly separate the hydrocarbons in the waxy intermediate fraction at a certain temperature. Various different types of vacuum distillation control systems may be employed, such as those taught in U.S. Pat. No. 3,365,386, 4,617,092, or 4,894,145; in order to provide the highest yields of desired fractions and exact cut points.

In one embodiment of the process, the higher boiling fraction is a bottoms fraction from the separating step. The lower boiling fraction is a distillate side cut.

Solvent Dewaxing

In one embodiment solvent dewaxing is used to dewax the lower boiling or the higher boiling fractions. Solvent dewaxing to make base oils has been used for over 70 years and is described, for example, in Chemical Technology of Petroleum, 3rd Edition, William Gruse and Donald Stevens, McGraw-Hill Book Company, Inc., New York, 1960, pages 566 to 570. The basic process involves:

mixing a waxy hydrocarbon stream with a solvent,
chilling the mixture to cause wax crystals to precipitate,
separating the wax by filtration, typically using rotary drum filters,
recovering the solvent from the wax and the dewaxed oil filtrate.

The solvent can be recycled to the solvent dewaxing process. The solvent may comprise, for example, a ketone (such as methyl ethyl ketone or methyl iso-butyl ketone) and an aromatic (such as toluene). Other types of suitable solvents are C3-C6 ketones (e.g. methyl ethyl ketone, methyl isobutyl ketone and mixtures thereof), C6-C10 aromatic hydrocarbons (e.g. toluene), mixtures of ketones and aromatics (e.g. methyl ethyl ketone and toluene), autorefrigerative solvents such as liquefied, normally gaseous C2-C4 hydrocarbons such as propane, propylene, butane, butylene and mixtures thereof. A mixture of methyl ethyl ketone and methyl isobutyl ketone can also be used.

There have been refinements in solvent dewaxing since its inception. For example, Exxon's DILCHILL® dewaxing process involves cooling a waxy hydrocarbon oil stock in an elongated stirred vessel, preferably a vertical tower, with a pre-chilled solvent that will solubilize at least a portion of the oil stock while promoting the precipitation of the wax. Waxy oil is introduced into the elongated staged cooling zone or tower at a temperature above its cloud point. Cold dewaxing solvent is incrementally introduced into the cooling zone along a plurality of points or stages while maintaining a high degree of agitation therein to effect substantially instantaneous mixing of the solvent and wax/oil mixture as they progress through the cooling zone, thereby precipitating at least a portion of the wax in the oil. DILCHILL® dewaxing is discussed in greater detail in the U.S. Pat. Nos. 4,477,333, 3,773,650, and 3,775,288. Texaco also has developed refinements in the process. For example, U.S. Pat. No. 4,898,674 discloses how it is important to control the ratio of methyl ethyl ketone (MEK) to toluene and to be able to adjust this ratio, since it allows use of optimum concentrations for processing various base stocks. Commonly, a ratio of 0.7:1 to 1:1 may be used when processing bright stocks; and a ratio of 1.2:1 to about 2:1 may be used when processing light stocks.

The wax mixture is typically chilled to a temperature in the range of from −10° C. to −40° C., or in the range of from −20° C. to −35° C., to cause the wax crystals to precipitate. Separating the wax by filtration may use a filter comprising a filter cloth which can be made of textile fibers, such as cotton; porous metal cloth; or cloth made of synthetic materials.

In one embodiment, the solvent dewaxing conditions will include that amount of solvent that when added to the waxy hydrocarbon stream will be sufficient to provide a liquid/solid weight ratio of about 5:1 to about 20:1 at the dewaxing temperature and a solvent/oil volume ratio between 1.5:1 to 5:1.

Hydroisomerization Dewaxing

In one embodiment, hydroisomerization dewaxing is used to dewax the lower boiling or higher boiling fractions. The hydroisomerization dewaxing is achieved by separately contacting the waxy intermediate fractions with a hydroisomerization dewaxing catalyst in an isomerization reactor under hydroisomerization dewaxing conditions. In one embodiment the hydroisomerization dewaxing catalyst comprises a shape selective intermediate pore size molecular sieve, a noble metal hydrogenation component, and a refractory oxide support. Examples of shape selective intermediate pore size molecular sieves include SAPO-11, SAPO-31, SAPO-41, SM-3, SM-7, ZSM-22, ZSM-23, ZSM-35, ZSM-48, ZSM-57, SSZ-32, SSZ-32X, metal modified SSZ-32X, offretite, ferrierite, and combinations thereof. SSZ-32X and metal modified SSZ-32X are described in U.S. Patent Publication US20080083657A1. SM-7 is described in U.S. patent application Ser. No. 12/181,652, filed Jul. 29, 2008.

The hydroisomerization dewaxing conditions include temperatures of 260° C. to about 413° C., a total pressure of 15 to 3000 psig, and a hydrogen to feed ratio from about 0.5 to about 30 MSCF/bbl. In some embodiments the hydrogen to feed ratio will be from about 1 to about 10 MSCF/bbl, or from about 4 to about 8 MSCF/bbl.

One example of a suitable upgrading process is described in U.S. Pat. No. 6,337,010, where the isomerization of the waxy intermediate feedstock is carried out at a lower total pressure than the hydrocracking operation.

Hydrofinishing

Optionally, the base stock produced by the dewaxing may be hydrofinished. The hydrofinishing may occur in one or more steps, either before or after the separating. The hydrofinishing is intended to improve the oxidation stability, UV stability, and appearance of the base stock by removing aromatics, olefins, color bodies, and solvents. A general description of hydrofinishing may be found in U.S. Pat. Nos. 3,852,207 and 4,673,487.

In one embodiment, the overall LHSV during hydrofinishing is about 0.25 to 2.0, or about 0.5 to 1.0. The hydrogen partial pressure can be greater than 200 psia, such as ranging from about 500 psia to about 2000 psia. Hydrogen recirculation rates can be greater than 50 SCF/Bbl, for example between 1000 and 5000 SCF/Bbl. Temperatures can range from about 149° C. to about 399° C. (300° F. to about 750° F.), such as from 232° C. to 316° C. (450° F. to 600° F.). Suitable hydrofinishing catalysts include noble metals from Group VIIIA (according to the 1975 rules of the International Union of Pure and Applied Chemistry), such as platinum or palladium on an alumina or siliceous matrix, and unsulfided Group VIIIA and Group VIB metals, such as nickel-molybdenum or nickel-tin on an alumina or siliceous matrix. U.S. Pat. No. 3,852,207 describes a suitable noble metal catalyst and mild conditions. Other suitable catalysts are described, for example, in U.S. Pat. No. 4,157,294, and U.S. Pat. No. 3,904,513.

The non-noble metal (such as nickel-molybdenum and/or tungsten) catalyst contains at least about 0.5, such as about 1 to about 15 weight percent of nickel and/or cobalt determined as the corresponding oxides. The noble metal (such as platinum) catalyst contains in excess of 0.01 percent metal, such as between 0.1 and 1.0 percent metal. Combinations of noble metals may also be used, such as mixtures of platinum and palladium.

Base Stock by Process

We provide a base stock made by the process comprising hydrocracking, separating, and hydroisomerization dewaxing, as described previously. In general, the hydrocracking hydrocracks the heavy hydrocarbon feedstock in a hydrocracking zone. The operating conditions in the hydrocracking zone are selected to convert the heavy hydrocarbon feedstock to a product slate containing greater than 30 wt % of a waxy intermediate fraction. The waxy intermediate fraction is separated into a lower boiling fraction and a higher boiling fraction. The higher boiling fraction is hydroisomerization dewaxed under conditions whereby the dewaxed higher boiling fraction is the base stock. The base stock has a first boiling range from 730 to 1000° F. (388 to 538° C.), a first VI from 105 to 120, a first CCS VIS at −25° C. from 2500 to 4500 mPa·s, and a ratio of a first Noack volatility to the first CCS VIS at −25° C. multiplied by 100 from 0.15 to 0.40.

In one embodiment the base stock is made by a process additionally including dewaxing of the lower boiling fractions. The dewaxing conditions are selected such that a dewaxed lower boiling fraction is produced having an additional boiling range from 700 to 925° F. (371 to 496° C.), and additional VI from 105 to 115, and an additional Noack volatility less than 18 wt %.

In one embodiment the dewaxed lower boiling fraction has a ratio of the additional Noack volatility to an additional CCS VIS at −25° C. multiplied by 100 from 0.80 to 1.55. The higher boiling fraction may be a bottoms fraction from the separating step. The lower boiling fraction is a distillate side-cut fraction.

Base Oil Manufacturing Plant

We provide a base oil manufacturing plant, comprising a hydrocracking reactor, a vacuum distillation tower, and a hydroisomerization reactor. The base oil manufacturing plant produces a first base stock having a first boiling range from 730 to 1000° F. (388 to 538° C.), a first VI from 105 to 120, a first CCS VIS at −25° C. from 2500 to 4500 mPa·s, and a ratio of a first Noack volatility to the first CCS VIS at −25° C. multiplied by 100 from 0.15 to 0.40. The base oil manufacturing plant may also produce an additional base stock having an additional boiling range from 700 to 925° F. (371 to 496° C.), an additional VI from 105 to 115, and an additional Noack volatility less than 18 wt %.

In one embodiment the operating conditions in the hydrocracking reactor are selected to convert a heavy hydrocarbon feedstock to a product slate containing greater than 20 wt %, greater than 25 wt %, or greater than 30 wt % of a waxy intermediate fraction.

In one embodiment the vacuum distillation tower separates the waxy intermediate fraction from the hydrocracking reactor into a lower boiling fraction and a higher boiling fraction. The lower boiling fraction may be block dewaxed in the hydroisomerization dewaxing reactor to produce the first base stock. The higher boiling fraction may be block dewaxed in the hydroisomerization dewaxing reactor to produce the additional base stock. In some embodiments block dewaxing can give better yields and higher VI than bulk dewaxing a broader boiling feedstock.

In one embodiment the vacuum distillation tower follows the hydrocracking reactor.

In one embodiment the base oil manufacturing plant produces the additional base stock having a ratio of the additional Noack volatility to an additional CCS VIS at −25° C. from 0.80 to 1.55. Optionally, the first base stock has a ratio of the first Noack volatility to the first CCS VIS at −25° C. multiplied by 100 from 0.20 to 0.35.

In one embodiment, the first base stock and the additional base stock are both Group II base oils.

In one embodiment the hydroisomerization catalyst comprises a shape selective intermediate pore size molecular sieve. Examples of these are SAPO-11, SAPO-31, SAPO-41, SM-3, SM-7, ZSM-22, ZSM-23, ZSM-35, ZSM-48, ZSM-57, SSZ-32, SSA-32X, metal modified SSZ-32X, offretite, ferrierite, and combinations thereof.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims.

EXAMPLES

Example 1

A few different samples of Chevron 170RLV base stock were made by hydrocracking and separating (by vacuum distillation) the waxy intermediate product from the hydrocracker into a heavy fraction and a light fraction. The hydrocracking conditions in the hydrocracking reactor were selected to convert vacuum gas oil to a product slate containing between 30 wt % and 40 wt % of a waxy intermediate fraction. After separating, the heavy and light fractions were block dewaxed using a hydroisomerization dewaxing catalyst comprising an intermediate pore size magnesium metal modified SSZ-32X molecular sieve, a platinum hydrogenation metal, and an alumina binder.

The average properties of the Chevron 170RLV base stock and the Chevron 110RLV base stock that were produced are shown below, in Table I:

TABLE I

| Property | 110RLV Base Oil | 170RLV Base Oil |
|---|---|---|
| Viscosity Index | 112 | 118 |
| SimDist (Wt %), ° F. | | |
| 5 | 713 | 744 |
| 10 | 727 | 770 |
| 20 | 745 | 798 |
| 30 | 760 | 817 |
| 40 | 773 | 831 |
| 50 | 785 | 845 |
| 60 | 797 | 859 |
| 70 | 810 | 875 |
| 80 | 825 | 893 |
| 90 | 844 | 919 |
| 95 | 859 | 941 |
| 99.5 | 907 | 994 |
| Kinematic Vis @100° C., mm²/s | 4.391 | 6.1 |

TABLE I-continued

| Property | 110RLV Base Oil | 170RLV Base Oil |
|---|---|---|
| Noack Volatility, wt % | 16.2 | 8.8 |
| CCS VIS at −25° C., mPa · s | 1367 | 3250 |
| Noack Volatility/CCS VIS at −25° C. × 100 | 1.19 | 0.27 |

Example 2

Others have manufactured base stocks having a boiling range of 730 to 1000° F. Three examples are Yubase 4, Yubase 6, and Shell XHVI 4.0. Some properties of these oils are shown below in Table II.

TABLE II

| Property | Yubase 4 | Yubase 6 | Shell XHVI 4.0 |
|---|---|---|---|
| Viscosity Index | 119 | 124 | 143 |
| SimDist (Wt %), ° F. | | | |
| 5 | 738 | 759 | 724 |
| 95 | 807 | 999 | 932 |
| Kinematic Vis @100° C., mm²/s | 3.747 | 5.955 | 3.967 |
| Noack Volatility, wt % | 14.52 | 7.24 | 13.23 |
| CCS VIS at −25° C., mPa · s | 790 | 2670 | <700 |
| Noack Volatility/CCS VIS at −25° C. × 100 | 1.83 | 0.27 | >1.8 |

All three of these base stocks are expensive to manufacture and purchase. Yubase 6 and Shell XHVI 4.0 are Group III base oils. Yubase 4 has a ratio of Noack volatility to CCS VIS at −25° C. that is higher than is desired for optimal blending. If Yubase 4 were added to the chart in FIG. 1 you can see that although its Noack volatility is close to the requirements for a 5W-XX engine oil, its CCS VIS at −25° C. is much lower than is necessary, which leads to blending inefficiency and excess cost.

Example 3

Five different Group III base stocks were tested and found to have the properties as shown in Table III. These different Group III base stocks are those that are often used in blending with Chevron 220R, or other Group II base oils, to meet the Noack volatility and CCS VIS at −25° C. requirements for multigrade engine oils.

TABLE III

| Property | 5R | SK-4 | SK-6 | Nexbase 3043 | Nexbase 3060 |
|---|---|---|---|---|---|
| Viscosity Index | 117 | 122 | 131 | 122 | 129 |
| Kinematic Vis @100° C., mm²/s | 4.7 | 4.23 | 6.52 | 4.33 | 6 |
| Noack Volatility, wt % | 15 | 15 | 7 | 14.4 | 5.9 |
| CCS VIS at −25° C., mPa · s | 1551 | 988 | 2845 | 1056 | 2456 |

Group III base oils are typically more expensive to manufacture and purchase than Group II base oils. Also, when they are used in engine oils they require additional testing to meet base oil interchange guidelines.

Example 5

The chart shown in FIG. 1 was prepared by selecting different pairs (having a first base stock and a second base stock) of petroleum derived Chevron base stocks, measuring the CCS VIS at −25° C. and the Noack volatility of each base stock and plotting the points (a first point and a second point) on a x-y chart. Blends of the paired Chevron base stocks were made in varying proportions and the CCS VIS at −25° C. and the Noack volatility of each of the blends were measured and used to construct a curve connecting the first and second points. For comparison, different pairs between Nexbase 3043, Nexbase 3060, and Chevron 220 were plotted, blended, and curves constructed in the same manner as the paired Chevron base stocks.

Base oil requirements for 5W, 10W, and 15W engine oils were set by charting the points representing the CCS VIS at −25° C. and the Noack volatility of current commercial engine oils that meet all requirements. These were added to the chart as small squares and the general regions for 5W-XX, 10W-XX, and 15W-XX were labeled.

As can be seen by the chart shown in FIG. 1, the curves between 110RLV and 170RLV fell exactly in the region for 5W-XX engine oils. This gave a good prediction that the 5W engine oil requirements could be met with a blend of only these two base stocks, and not requiring any trim stock. The curves between 110RLV and Chevron 220R fell exactly in the region for 10W-XX engine oils. This gave a good prediction that the 10W engine oil requirements could be met with a blend of only these two base stocks, and not requiring any trim stock. If a 10W-XX engine oil were desired having either or both of a lower CCS VIS at −25° C. or a lower Noack volatility, then blending in a third base stock of Chevron 170RLV would be perfect.

FIG. 1 also shows that the Chevron 220R could be blended directly into a 15W-XX engine oil without a second base stock or trim stock. If a 15W-XX engine oil were desired having a lower CCS VIS at −25° C., then a simple blend of Chevron 220R with a small amount of Chevron 110RLV would meet these requirements. If a 15W-XX engine oil were desired having a lower Noack volatility, then a simple blend of Chevron 220R with a small amount of Chevron 170RLV would meet these requirements. There are advantages to being able to blend all three of 5W, 10W, and 15W grade engine oils without using any Group III base oil. The advantages include reduced base oil cost, easier base oil interchange, less engine testing, and better blending efficiency.

Blending efficiency is demonstrated by the smaller area encompassed by the curves between the Group II base oils in FIG. 1, and the closeness of the curves to the base oil requirements for the 5W, 10W, and 15W engine oils. With Chevron 110RLV and Chevron 170RLV we could meet 5W, 10W, and 15W formulation requirements without incorporating any Noack/CCS overkill like the system with Group III base stocks did. FIG. 1 also shows the relative flexibility and stability of a base stock slate with Chevron 110RLV and Chevron 170RLV, i.e., if a new formulation requirement comes out that is more stringent, we will most likely not have to make drastic changes to get to that point. In other words, the Group III-based system would require more compositional changes, such as addition of other trim stocks, or different additives.

We claim:

1. A process to manufacture a base stock, comprising:
   a. hydrocracking a heavy hydrocarbon feedstock in a hydrocracking zone, wherein the operating conditions in the hydrocracking zone are selected to convert the heavy hydrocarbon feedstock to a product slate containing greater than 20 wt % of a waxy intermediate fraction;
   b. separating the waxy intermediate fraction into a lower boiling fraction and a higher boiling fraction; and
   c. dewaxing the higher boiling fraction under conditions whereby the dewaxed higher boiling fraction has:
      i. a first boiling range from 730 to 1000° F. (388 to 538° C.),
      ii. a first VI from 105 to 120,
      iii. a first CCS VIS at −25° C. from 2500 to 4500 mPa·s, and
      iv. a ratio of a first Noack volatility to the first CCS VIS at −25° C. multiplied by 100 from 0.15 to 0.40, and
   wherein the dewaxing is hydroisomerization dewaxing, solvent dewaxing, or a combination thereof, wherein the hydroisomerization dewaxing is performed at a total pressure of between about 2000 to 3000 psig.

2. The process of claim 1, including dewaxing the lower boiling fraction under conditions whereby the dewaxed lower boiling fraction has:
   i. an additional boiling range from 700 to 925° F. (371 to 496° C.),
   ii. an additional VI from 105 to 115, and
   i. an additional Noack volatility less than 18 wt %.

3. The process of claim 2, wherein the dewaxed lower boiling fraction has a ratio of the additional Noack volatility to an additional CCS VIS at −25° C. multiplied by 100 from 0.80 to 1.55.

4. The process of claim 1, wherein the higher boiling fraction is a bottoms fraction.

5. A process to manufacture a base stock, comprising:
   a. hydrocracking a heavy hydrocarbon feedstock in a hydrocracking zone, wherein the operating conditions in the hydrocracking zone are selected to convert vacuum gas oil to a product slate containing greater than 20 wt % of a waxy intermediate fraction;
   b. separating the waxy intermediate fraction into a lower boiling fraction and a higher boiling fraction;
   c. dewaxing the higher boiling fraction under conditions whereby the dewaxed higher boiling fraction has:
      i. a first boiling range from 730 to 1000° F. (388 to 538° C.),
      ii. a first VI from 105 to 120,
      iii. a first CCS VIS at −25° C. from 2500 to 4500 mPa·s, and
      iv. a ratio of a first Noack volatility to the first CCS VIS at −25° C. multiplied by 100 from 0.15 to 0.40; and
   d. dewaxing the lower boiling fraction under conditions whereby the dewaxed lower boiling fraction has
      i. an additional boiling range from 700 to 925° F. (371 to 496° C.),
      ii. an additional VI from 105 to 115, and
      ii. an additional Noack volatility less than 18 wt %, and
   wherein the dewaxing is hydroisomerization dewaxing which is performed at a total pressure of between about 2000 to 3000 psig.

* * * * *